US012779254B2

(12) United States Patent
Roesser et al.

(10) Patent No.: US 12,779,254 B2
(45) Date of Patent: Nov. 3, 2026

(54) MULTILAYER FACE-COVERING

(71) Applicant: Milwaukee Electric Tool Corporation, Brookfield, WI (US)

(72) Inventors: Collin D. Roesser, Milwaukee, WI (US); Emelie E. Troedson, Seattle, WA (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 162 days.

(21) Appl. No.: 17/525,430

(22) Filed: Nov. 12, 2021

(65) Prior Publication Data

US 2022/0143434 A1 May 12, 2022

Related U.S. Application Data

(63) Continuation of application No. PCT/US2021/058752, filed on Nov. 10, 2021.
(Continued)

(51) Int. Cl.
*A41D 13/11* (2006.01)
*A62B 18/08* (2006.01)

(52) U.S. Cl.
CPC ............ *A62B 18/084* (2013.01); *A41D 13/11* (2013.01)

(58) Field of Classification Search
CPC .. A41D 13/11; A41D 13/1107; A41D 13/113; A41D 13/1138; A41D 13/1161; A41D 13/1192; A41D 13/1115; A41D 13/1123; A41D 13/1146; A41D 13/1153; A41D 13/1169; A41D 13/1176; A41D 13/1184; A62B 23/025; A62B 23/02; A62B 18/025
(Continued)

(56) References Cited

U.S. PATENT DOCUMENTS 4,883,052 A 11/1989 Weiss et al.
5,819,731 A 10/1998 Dyrud et al.
(Continued)

FOREIGN PATENT DOCUMENTS

CN 2870506 2/2007
CN 203884737 10/2014
(Continued)

OTHER PUBLICATIONS

Dictionary.com, “along,” https://www.dictionary.com/browse/along.*
(Continued)

*Primary Examiner* — Victoria Hicks Fisher
(74) *Attorney, Agent, or Firm* — Reinhart Boerner Van Deuren s.c.

(57) ABSTRACT

A multilayered face-covering is provided with at least two layers and joined with a centrally located merge stitch or nose seam. The outer is a thicker knitted cloth material with a higher thread-weight and/or thread-count than the inner layer to create an increased stiffness on the outer layer that resists compressive buckling. The inner layer is lightweight and provides a comfortable cushion against the user's skin. Face-covering can also include a intermediate layer sandwiched between inner and outer layers. The intermediate layer provides additional filtering of inhaled and/or exhaled particles and enhances the outer layer's rigidity.

17 Claims, 2 Drawing Sheets

Related U.S. Application Data

(60) Provisional application No. 63/112,890, filed on Nov. 12, 2020.

(58) Field of Classification Search
USPC .......................................................... 128/863
See application file for complete search history.

(56) References Cited

U.S. PATENT DOCUMENTS

| | | | | |
|---|---|---|---|---|
| 6,070,578 | A | 6/2000 | Baughman et al. | |
| 6,095,143 | A | 8/2000 | Dyrud et al. | |
| 9,408,424 | B2 | 8/2016 | Noh et al. | |
| 9,963,611 | B2 | 5/2018 | Stewart et al. | |
| 2005/0079379 | A1 | 4/2005 | Wadsworth et al. | |
| 2009/0151733 | A1* | 6/2009 | Welchel | A41D 13/113 128/863 |
| 2010/0307503 | A1 | 12/2010 | Iwamoto et al. | |
| 2011/0159758 | A1 | 6/2011 | Martin | |
| 2011/0296584 | A1 | 12/2011 | Kuo | |
| 2015/0305417 | A1 | 10/2015 | Martin | |
| 2016/0015098 | A1 | 1/2016 | Conlon | |
| 2016/0113336 | A1 | 4/2016 | Shibata et al. | |
| 2017/0157436 | A1 | 6/2017 | Hosmer | |
| 2018/0264294 | A1* | 9/2018 | Hancock | A41D 13/1138 |
| 2019/0000162 | A1 | 1/2019 | Houde | |
| 2020/0022430 | A1* | 1/2020 | Wang | D03D 11/00 |
| 2021/0329995 | A1* | 10/2021 | Dietz | A62B 18/025 |
| 2021/0386134 | A1* | 12/2021 | Plank | A41D 13/1161 |
| 2022/0062671 | A1* | 3/2022 | Kanyikirize | A41D 13/1107 |
| 2022/0071323 | A1* | 3/2022 | Rudy | A41D 13/1138 |
| 2022/0117333 | A1* | 4/2022 | McCreesh | A42B 1/046 |
| 2022/0125133 | A1* | 4/2022 | Chen | A41D 13/1161 |
| 2023/0037426 | A1* | 2/2023 | Fukuda | A62B 18/02 |

FOREIGN PATENT DOCUMENTS

| | | |
|---|---|---|
| CN | 203934688 | 11/2014 |
| CN | 203952513 | 11/2014 |
| CN | 204232352 | 4/2015 |
| CN | 205268853 | 6/2016 |
| CN | 205547449 | 9/2016 |
| CN | 205624592 | 10/2016 |
| CN | 104921345 | 11/2016 |
| CN | 206006036 | 3/2017 |
| CN | 206079122 | 4/2017 |
| CN | 206260891 | 6/2017 |
| CN | 206304451 | 7/2017 |
| CN | 105615053 | 12/2017 |
| CN | 107549897 | 1/2018 |
| CN | 107549899 | 1/2018 |
| CN | 107708459 | 2/2018 |
| CN | 206996064 | 2/2018 |
| CN | 207322741 | 5/2018 |
| CN | 207492139 | 6/2018 |
| CN | 108771294 | 11/2018 |
| CN | 208065600 | 11/2018 |
| CN | 209268784 | 8/2019 |
| CN | 111134395 | 5/2020 |
| CN | 111329147 | 6/2020 |
| CN | 210940747 | 7/2020 |
| CN | 210988355 | 7/2020 |
| CN | 211129827 | 7/2020 |
| DE | 2717968 | 12/1977 |
| DE | 202020101848 | 5/2020 |
| DE | 202020101979 | 5/2020 |
| DE | 202020102076 | 7/2020 |
| DE | 202020102120 | 7/2020 |
| DE | 202020105972 | 10/2020 |
| JP | 3227224 | 8/2020 |
| WO | WO16106054 | 6/2016 |
| WO | WO 2017-073675 | 5/2017 |
| WO | WO19047333 | 3/2019 |
| WO | WO19110895 | 6/2019 |
| WO | WO20042096 | 3/2020 |

OTHER PUBLICATIONS

International Search Report and Written Opinion for International Application No. PCT/US2021/058752 dated Mar. 4, 2022, 10 pages.

Under Armour, UA Sportsmask, https://www.underarmour.com/en-US/p/ua-sportsmask/1368010.html, Believed to be commercially available before Sep. 25, 2020, 17 pages.

* cited by examiner

MULTILAYER FACE-COVERING

CROSS-REFERENCE TO RELATED PATENT APPLICATION

This application is a continuation of International Application No. PCT/2021/058752, filed Nov. 10, 2021, which claims the benefit of and priority to U.S. Provisional Application No. 63/112,890, filed Nov. 12, 2020, the contents of which are incorporated herein by reference in their entireties.

BACKGROUND OF THE INVENTION

The present invention relates generally to the field of face protection. The present invention relates specifically to a multilayered face-covering. In general, face-coverings limit the exhalation of particles (e.g., such as virus-containing respiratory particles) and/or shield a user from inhaling unwanted particles into the nose or mouth.

SUMMARY OF THE INVENTION

One embodiment of the invention relates to a multilayered face-covering with an outer layer and an inner layer. The outer layer and inner layers are formed from a cloth material. The outer layer's cloth material has a higher thread-weight and/or thread-count than the inner layer's cloth material. The multilayer face-covering includes a merge stitch located at or near a center widthwise location of the face-covering. The merge stitch passes through the outer layer and the inner and retains the inner layer adjacent to the outer layer at the stitch/seam. In some embodiments, the higher thread-weight and/or thread-count of the fabric provides an increased stiffness or rigidity to the face-covering, e.g., when a user inhales. The lighter weight cloth of the inner layer provides a soft cushion for the skin. In one embodiment, the outer layer's cloth material is a polyester/elastic blend with a weight equal to or greater than 150 $g/m^2$, and the cloth material of the inner layer is a polyester knitted honeycomb material having a weight equal to or greater than 100 $g/m^2$.

Another embodiment of the invention relates to a multilayered face-covering with three or more layers. The face-covering includes an outer intermediate layer, a stiff middle layer, and a soft inner layer. The outer intermediate layer includes a knitted interlock polyester material. The middle layer has a greater thread-weight and/or thread-count to create a rigid structural layer. The inner layer has a knitted honeycomb layer that is soft and retained against the middle layer. The knitted honeycomb of the inner layer recycles expired air to produce a cooling effect.

In various embodiments, the layers comprise 100% polyester. For example, the outer layer has a polyester knitted interlock with a weight equal to or greater than 180 $g/m^2$. The middle layer has a polyester knitted honeycomb with a weight equal to or greater than 120 $g/m^2$. An inside lightweight layer has a polyester knitted honeycomb layer with a weight equal to or greater than 100 $g/m^2$.

Another embodiment of the invention relates to a multilayered face-covering with combined or merged stitching joining the layers adjacent to a central location of each layer. The combined stitching passes through each layer, including an outer and an inner layer. A binding stitch passes around the upper and lower perimeter of the covering to form a binding. The merge stitch couples each layer of the covering at a central location on the covering. In some embodiments, the merge stitch extends through the center of the covering from a first end under the binding stitch adjacent to a nose and a second end under the binding stitch adjacent to the user's chin.

The binding stitch includes 2-10 stitches every 25 mm located between 1 mm and 7 mm from an edge in various embodiments. The binding stitch has a stitch overlap equal to or greater than 3 stitches. A bar tack stitch couples the binding to an adjustable strap. The bar tack stitch has a width of over 5 mm and 20 or more stitches per 25 mm. The merge stitch has more than 2 stitches per 25 mm, and a merge stitch overlap greater than or equal to 3 stitches. The material overlap in the merge stitch is less than or equal to 5 mm.

Another embodiment of the invention relates to a face covering that has a body sized to substantially cover at least a mouth and a nose of a human face. The body includes an outer layer comprised of a first fabric and an inner layer comprised of a second fabric. The second fabric is less rigid than the first fabric. A merge stitch extends through a center region of the body and couples the inner layer to the outer layer along the length of the merge stitch. First and second ear straps are coupled to the body. The first and second ear straps are configured to couple to a right and left human ear, respectively.

Another embodiment of the invention relates to another face covering having a body sized to substantially cover at least a mouth and a nose of a human face. The body includes an outer layer comprised of a first cloth material and an inner layer comprised of a second cloth material. The first cloth material is more rigid than the second cloth material. The inner layer has an inner layer perimeter, and the outer layer has an outer layer perimeter. A merge stitch passes through the outer layer and the inner layer, coupling the outer layer to the inner layer along the length of the merge stitch. The merge stitch has a first end and a second end, and the second end is spaced apart from the inner layer perimeter. A pair of ear straps are coupled to the body.

Another embodiment of the invention relates to another face covering having a body sized to substantially cover at least a mouth and a nose of a human face. The body has an interior surrounded by a perimeter and includes an outer layer comprised of a first fabric and an inner layer comprised of a second fabric. The first fabric is more rigid than the second fabric. A first merge stitch extends through a center region of the interior and couples the inner layer to the outer layer along the length of the first merge stitch. A second merge stitch extends along at least a portion of the perimeter and couples the inner layer to the outer layer along the length of the second merge stitch. Additionally, one or more straps are coupled to the perimeter of the body. The one or more straps are configured to couple the body to a human head.

Alternative exemplary embodiments relate to other features and combinations of features as may be generally recited in the claims.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a multilayered face-covering are shown. An outer layer is formed from a thick cloth material (e.g., a knitted or woven cloth material), and the inner layer is formed from a thinner cloth material (e.g., a knitted or woven cloth material). The outer layer has a higher thread-weight and/or thread-count than the inner layer. The increased thread-weight/thread-count creates an outer layer with higher stiffness relative to the inner layer. The higher rigidity of the outer layer resists compressive buckling, for example, when a user inhales. This facilitates breathing through the face-covering. The inner layer is lightweight and provides a comfortable cushion against the user's skin. For example, the inner layer wicks water/moisture away from the user's mouth and/or nose and provides a cooling effect on the skin. In various embodiments, face-covering includes an additional intermediate layer. The intermediate layer is sandwiched between the inner and outer layers or can cover an inner surface of the outer layer. The intermediate layer provides additional filtering of inhaled and/or exhaled particles.

A merge stitch located at or near a widthwise central location of the covering joins the inner, outer, and/or intermediate layers of multilayered facial covering. The merge stitch extends through all the layers (e.g., the inner, outer, and/or intermediate layers) and serves to retain the inner layer adjacent to the outer layer at the stitch/seam. This provides a comfortable cushion layer against the user's skin and a flexible layer retained by the rigid outer layer at the seam. A binding stitch passes around a perimeter of the facial covering and includes an adjustable flexible bridge and/or binding (e.g., a thin metal bar) about the user's nose, chin, or other areas where the binding abuts the user's face.

Figure 1:
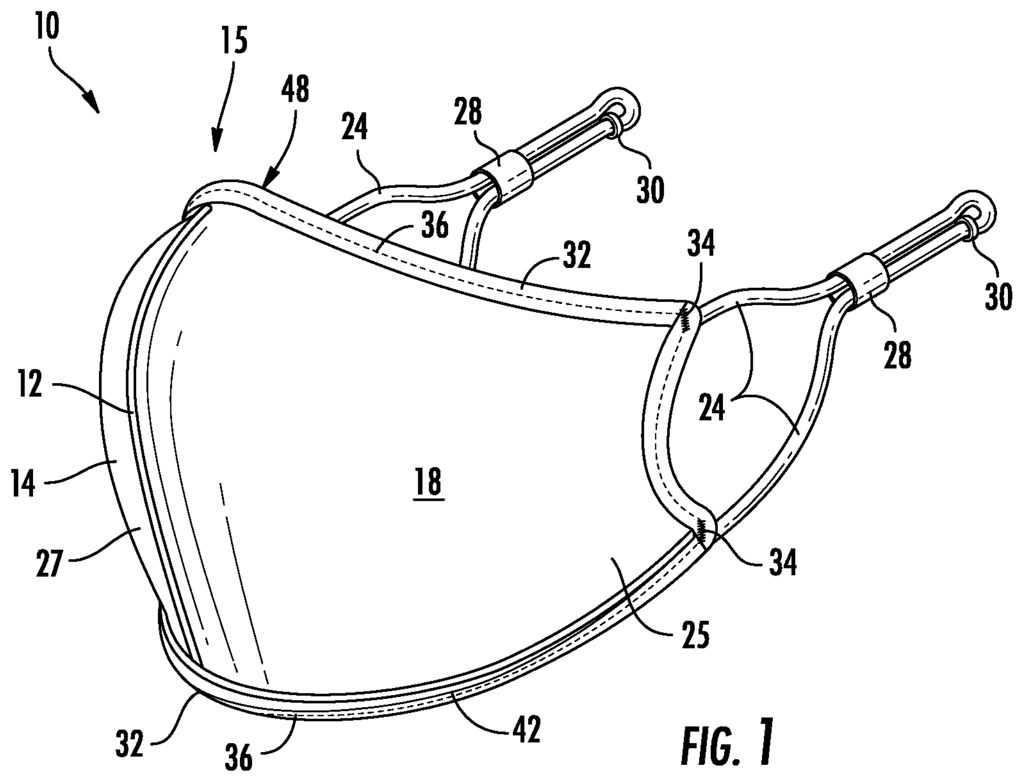
FIG. 1 is a front perspective view of a multilayered face-covering, according to an exemplary embodiment.

FIG. 1 shows a multilayered face-covering 10. Two, three, or more layers 14 are coupled together to form a body 15 of the face covering 10. The body 15 is sized to substantially cover at least the mouth and nose of a human face. A merge seam or merge stitch 12, comprised of a series of aligned, individual stitches, extends across the body 15 for a merge stitch length. The merge stitch 12 couples the layers 14 together along the merge stitch length. In a specific embodiment, the merge stitch 12 is a three-needle flatlock seam. Some embodiments may include only a single merge stitch 12, and other embodiments may include a plurality of merge stitches 12. At least one merge stitch 12 is located near a center region of the body 15. For purposes of this disclosure, the phrase "center region" defines a region that includes the middle 30-70% of the body 15 widthwise. In FIG. 1, the merge stitch 12 is shown in a widthwise central location of the body, such that the merge stitch 12 substantially bisects the body 15.

Figure 4:
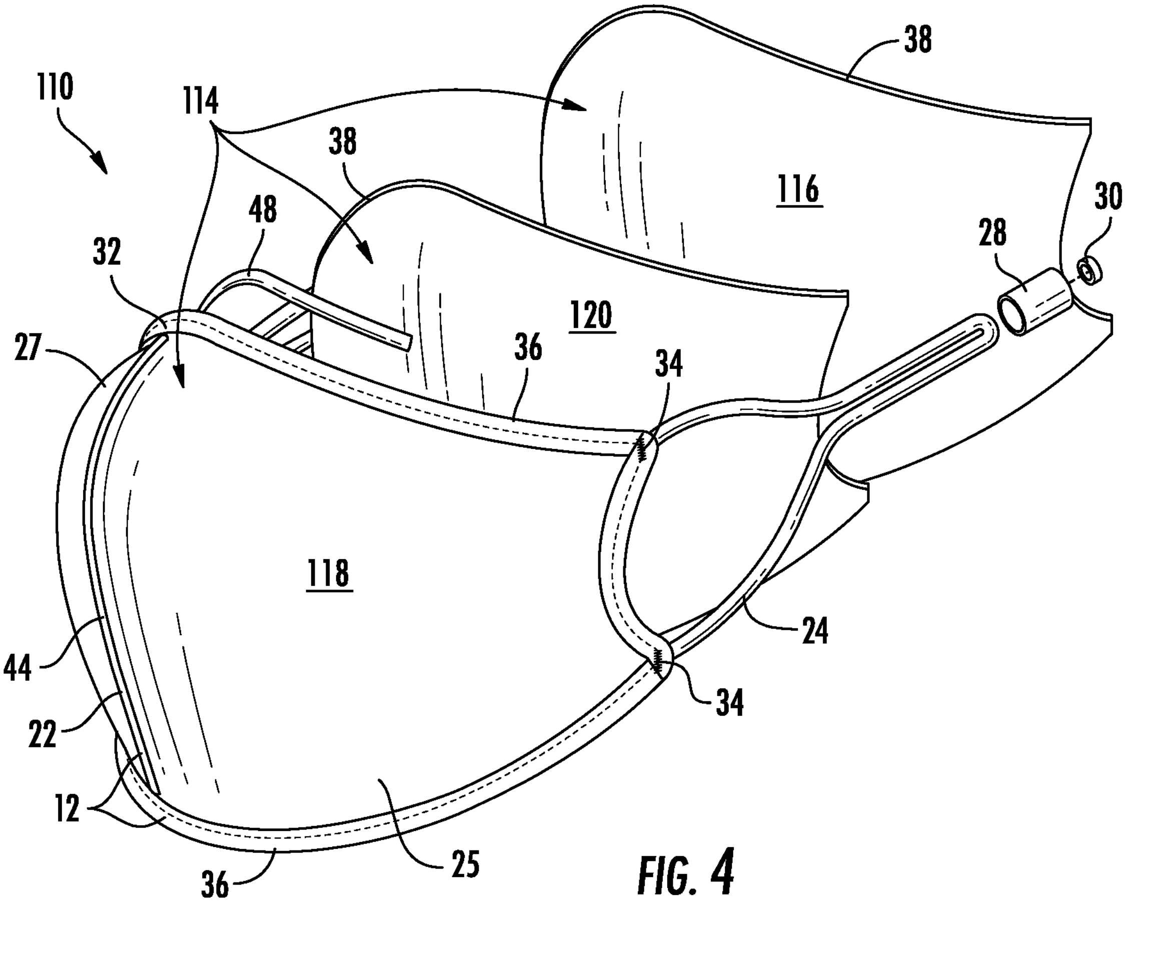
FIG. 4 is an exploded view of a three-layered face-covering, according to another exemplary embodiment.

The layers 14 includes a soft inner layer 16 and a rigid outer layer 18, but may also include one or more middle or intermediate layers (FIG. 4). Layers 14 are combined along the merge stitch 12 that is centrally located through a vertical midplane (e.g., at a widthwise central location) of the face-covering 10 between a pair of straps 24. In various embodiments, one or more straps 24 are coupled to the body 15 and are configured to couple the body 15 to a user's head. Here, the straps 24 shown are shown as a pair of ear straps that are configured to couple to (e.g., be worn over) a user's right and left ears, respectively. The widthwise centrally located merge stitch 12 divides the body 15 into a left covering 25 and a right covering 27 joined over the brim of the user's nose and extends down over a midpoint of the user's chin. The central location of merge stitch 12 reinforces rigid outer layer 18 and provides a rigid external boundary that resists compression, e.g., during inhalation.

Straps 24 on the left and right sides of face-covering 10 (e.g., left covering 25 and right covering 27) include an adjuster 28 and a ring 30. The adjuster 28 is used to increase or decrease the size of strap 24, extending about the user's ear. This helps customize the fit of the face-covering 10 for the particular user. Ring 30 couples to adjuster 28 to prevent adjuster 28 from inadvertently disconnecting from strap 24 and falling from the face-covering 10. Thus, ring 30 helps a user lock in the customized fit following proper adjustment of adjuster 28. Straps 24 couple to an edge binding 32 (e.g., sewn into binding with bar tack 34). In various embodiments, edge bindings 32 are formed of one or more merge stitches that couple the layers 14 together along the respective perimeters of the layers 14. Edge bindings 32 provide a rigid outer boundary that maintains face-covering 10 and prevents collapse during inhalation through a user's nose or mouth. Edge bindings 32 also conform to the user's face to create a seal between the user's skin and the face-covering 10. In some embodiments, the edge bindings are at least 3 mm wide and at least 300 mm long, specifically, at least 4 mm wide and at least 305 mm long, and more specifically at least 5 mm wide and at least 310 mm long.

In various embodiments, a binding stitch 36 includes 2-10 stitches every 25 mm, located between 1 mm and 7 mm from an edge 38 of face-covering 10. Binding stitch 36 has a second merge stitch overlap equal to or greater than 3 stitches. Bar tack 34 couples edge binding 32 to an adjustable strap 24. Bar tack 34 has a width of over 5 mm and 20 or more stitches per 25 mm. Merge stitch 12 has more than 2 stitches per 25 mm. Merge stitch 12 has a first merge stitch overlap is greater than or equal to 3 stitches. The material overlap in merge stitch 12 is less than or equal to 5 mm.

In various embodiments, merge stitch 12 is a three-needle flatlock stitch with 15-21 stitches per 25 mm. Binding stitch 36 is a single lockstitch with 5-7 stitches per 25 mm. Binding stitch 36 is located within 1-10 mm of edge 38 of face-covering 10 layers 14, specifically within 2-5 mm of edge 38. Bar tack 34 includes over 20 stitches per 25 mm, specifically over 25 stitches per 25 mm. In one embodiment, bar tack 34 includes 26 stitches per 25 mm. Stated differently, bar tack 34 includes more than one stitch per millimeter.

Figure 2:
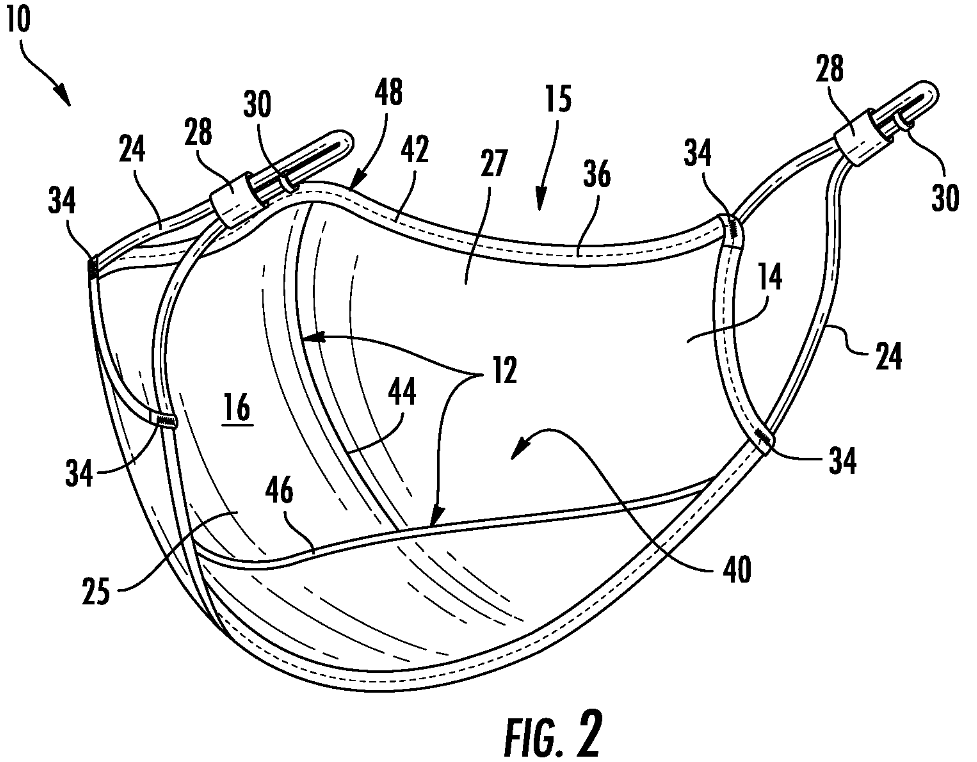
FIG. 2 is a rear perspective view of a multilayered face-covering, according to another exemplary embodiment.

FIG. 2 shows a back perspective view of multilayered face-covering 10. As shown, merge stitch 12 and outer layer 18 form an internal cavity 40 that receives a user's nose and mouth and covers a part of the user's chin. Edge binding 32 includes a medial thread 42 that secures edge binding 32 to an edge 38 of face-covering 10. In the embodiment of FIG. 2, merge stitch 12 is comprised of a nose stitch 44 and a chin stitch 46, positioned substantially perpendicular to nose stitch 44. As shown in FIG. 2, nose stitch 44 intersects chin stitch 46. As shown in FIG. 2, chin stitch 46 is spaced a distance from a lower portion of the perimeter of body 15. In another embodiment, such as the embodiment shown in FIG. 1, nose stitch 44 extends to the edge binding 32. For example, nose stitch 44 is between 40 mm and 170 mm, specifically between 45 mm and 165 mm. In various embodiments, nose stitch 44 extends from edge binding 32 over a brim of the user's nose to edge binding 32 under the user's chin. In other embodiments, nose stitch 44 couples to chin stitch 46 to form a lower brim covering the user's chin.

Figure 3:
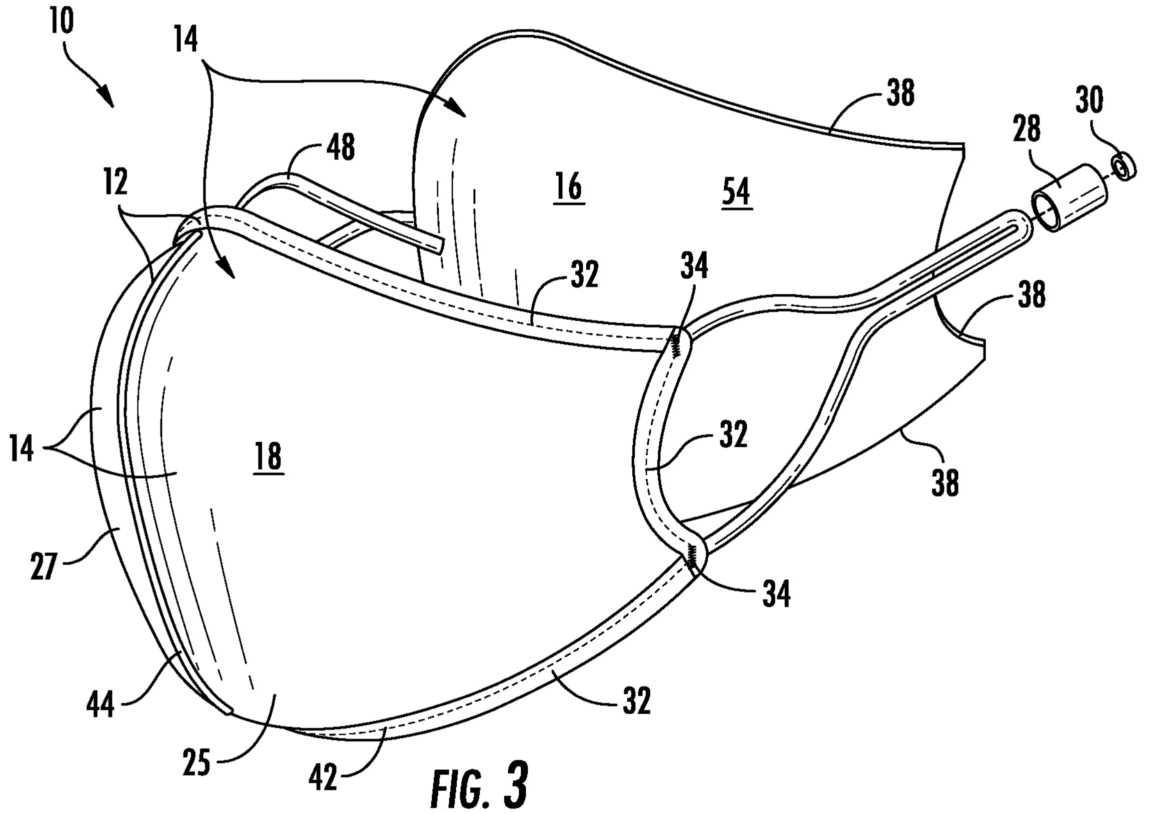
FIG. 3 is an exploded view of a multilayered face-covering, according to another exemplary embodiment.

FIG. 3 is an exploded view of a multilayered face-covering 10 having inner layer 16, outer layer 18, and nose bridge 48. In various embodiments, nose bridge 48 is a metal wire with a width of at least 2 mm and a length of at least 100 mm, specifically, a width of at least 3 mm and a length of at least 110 mm. Here, inner layer 16 comprises a soft mini mesh of honeycomb. Inner layer 16 is manufactured from a filament yarn material. The lighter weight cloth material of inner layer 16 provides a soft cushion for the user's skin. In one embodiment, the heavier honeycomb and/or yarn material on outer layer 18 is a polyester/elastic blend with a weight equal to or greater than 150 g/m$^2$, and the cloth material of inner layer 16 is a polyester knitted honeycomb material having a weight equal to or greater than 100 g/m$^2$.

For example, the yarn material has either an S or a Z twist direction. Inner layer 16 is at least 75% nylon and 25% polyurethane (e.g., spandex); specifically, inner layer 16 is at least 80% nylon and 18% polyurethane. In a specific embodiment, inner layer 16 is 82% nylon and 18% polyurethane. Inner layer 16 comprises nylon and polyurethane to create an inherently cooling fabric material and includes moisture-wicking properties. In various embodiments, inner layer 16 has a fabric weight of fewer than 150 grams per square meter (GSM), specifically 140 GSM, and more specifically 135 GSM. In some embodiments, inner layer 16 includes an antimicrobial property. For example, face-covering 10 includes an antiviral chemical, such as an antiviral PROTX2 AV chemical that kills COVID-19 and other viruses.

In some embodiments, inner layer 16 includes a nylon material with a yarn denier of 70D (e.g., 70 g/9000 m) and a hairiness or fluff index of 68F, polyester yarn with a denier of 70D and a fluff index of 24F, and a 30 denier polyurethane material. Outer layer 18 includes a 75 denier polyester with a fluff index of 72F and a 30 denier polyurethane material.

Outer layer 18 includes a polyester and polyurethane blended material with a fabric weight of 150 GSM or more, specifically 160 GSM or greater. In various embodiments, outer layer 18 comprises at least 80% polyester and less than 20% polyurethane, specifically, at least 85% polyester and less than 15% polyurethane. In one embodiment, outer layer 18 has at least 86% polyester and less than 14% polyurethane. Outer layer 18 is made from a filament material in either a Z or S twist to form a jersey fabric construction. Like inner layer 16, outer layer 18 can contain an antimicrobial, antibacterial, and/or antiviral treatment, such as PROX2 AV. In some embodiments, outer layer 18 has a durable water-repellant (DWR) property that prevents water penetration into face-covering 10.

FIG. 4 is an exploded view of a three-layered face-covering 110. Face-covering 110 is substantially the same as face-covering 10 except for the differences discussed herein. Face-covering 110 includes a middle layer 120 positioned between an inner layer 116 and an outer layer 118. Inner layer 116 and outer layer 118 are substantially the same as inner and outer layers 16 and 18 described above, except for the differences described herein. In this embodiment, merge stitch 112 interconnects all three layers 114, specifically, interconnects inner layer 116, middle layer 120, and outer layer 118.

In further various embodiments, the layers 14 include 100% polyester. For example, outer layer 18 has a polyester knitted interlock with a weight equal to or greater than 180 g/m$^2$. Middle layer 120 has a polyester knitted honeycomb with a weight equal to or greater than 120 g/m$^2$. Inner layer 16 is lightweight and has a polyester knitted material forming the honeycomb layer with a weight equal to or greater than 100 g/m$^2$.

Inner layer 16 includes nylon and polyurethane and has a fabric weight of less than or equal to 140 GSM, specifically less than or equal to 135 GSM. Inner layer 16 is a mini mesh honeycomb filament yarn material in a Z or S twist. Inner layer 16 is a moisture-wicking material to cool the user's skin (e.g., following exhalation) and may include an antimicrobial PROTX2 AV treatment.

Middle layer 120 is a honeycomb knitted polyester blend with a fabric weight of 180 GSM, specifically 190 GSM, and more specifically 200 GSM or more. Middle layer 120 is a yarn filament with a Z or S twist and comprises a polyester with a denier of 150D and a fluff index of 72F. In one embodiment, middle layer 120 includes a 100% polyester material.

Outer layer 18 is a polyester and polyurethane interlock composite material with a fabric weight of 200 GSM, specifically 220 GSM, and more specifically 230 GSM or more. The filament has an S or Z twist and is a locally durable water repellant (DWR). In some embodiments, outer layer 18 is treated with an antimicrobial PROX2 AV treatment. In one embodiment, outer layer 18 includes polyester with a denier of 50D and a fluff index of 36F and polyurethane with a denier of 20D. In various embodiments, outer layer 18 is at least 80% polyester, specifically, at least 85% polyester, and more specifically, at least 90% polyester. Stated differently, outer layer 18 comprises less than 20% polyurethane, specifically less than 15% polyurethane, and more specifically, less than 10% polyurethane.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements. The position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to various ranges (e.g., plus or minus 30%, 20%, or 10%) around any of the absolute or relative dimensions disclosed herein or determinable from the Figures.

What is claimed is:

1. A face covering, comprising:

a body sized to substantially cover at least a mouth and a nose of a human face, the body having an interior surrounded by a perimeter, the body comprising:

an outer layer comprised of a first fabric;

an inner layer comprised of a second fabric;

a first merge stitch including a chin stitch and a nose stitch, wherein the nose stitch extends through a center region of the interior and couples the inner layer to the outer layer along a length of the nose stitch, and wherein the chin stitch extends through the center region of the interior and extends in a direction substantially perpendicular to the nose stitch and couples the inner layer to the outer layer along a length of the chin stitch; and a second merge stitch that extends along and is coincident with at least a lower portion of the perimeter and couples the inner layer to the outer layer along the length of the second merge stitch; and one or more straps coupled to the perimeter of the body and configured to couple the body to a human head;

wherein the first fabric is more rigid than the second fabric;

wherein the chin stitch intersects the nose stitch at a location in a lower half of the body along an axis defined by the nose stitch, the axis extending from the lower portion of the perimeter to an opposing upper portion of the perimeter, and wherein the nose stitch terminates at the intersection with the chin stitch such that there is an unstitched portion along the axis between the chin stitch and a portion of the second merge stitch coincident with the lower portion of the perimeter; and wherein the chin stitch is positioned along the body between the portion of the second merge stitch coincident with the lower portion of the perimeter and the nose stitch.

2. The face covering of claim 1, wherein the second merge stitch comprises an edge binding that forms a rigid boundary along at least the lower portion of the perimeter.

3. The face covering of claim 1, wherein the nose stitch has a length between 40 mm and 170 mm.

4. The face covering of claim 1, wherein the body further comprises a lower brim formed by the nose stitch coupled to the chin stitch.

5. The face covering of claim 1, wherein the first merge stitch has a first merge stitch overlap of at least 3 stitches.

6. The face covering of claim 5, wherein the second merge stitch has a second merge stitch overlap of at least 3 stitches.

7. The face covering of claim 1, wherein the chin stitch extends through a vertical midplane.

8. The face covering of claim 1, wherein the nose stitch substantially bisects the body.

9. The face covering of claim 1, wherein the first merge stitch is a three-needle flatlock stitch with 15-21 stitches per 25 mm.

10. The face covering of claim 1, wherein the weight of the first fabric is greater than the weight of the second fabric.

11. The face covering of claim 10, wherein the first fabric comprises a blend of polyester and elastic, and wherein the second fabric comprises a polyester knitted honeycomb material.

12. The face covering of claim 10, wherein the first fabric has a weight equal to or greater than 150 $g/m^2$.

13. The face covering of claim 10, wherein the second fabric has a weight equal to or greater than 100 $g/m^2$.

14. The face covering of claim 10, wherein the second fabric comprises a blend of nylon and polyurethane, and wherein the blend of nylon and polyurethane has a weight less than 150 $g/m^2$.

15. The face covering of claim 1, wherein the body further comprises a middle layer positioned between the inner layer and the outer layer.

16. The face covering of claim 15, wherein the middle layer is comprised of a third material, wherein the third material is a honeycomb knitted polyester blend.

17. The face covering of claim 16, wherein the honeycomb knitted polyester blend has a weight equal to or greater than 180 $g/m^2$.

* * * * *